Oct. 26, 1965   R. W. MOYE   3,214,047
TRAILER

Original Filed April 4, 1960   2 Sheets-Sheet 1

INVENTOR.
ROBERT W. MOYE

Oct. 26, 1965 R. W. MOYE 3,214,047
TRAILER
Original Filed April 4, 1960 2 Sheets-Sheet 2
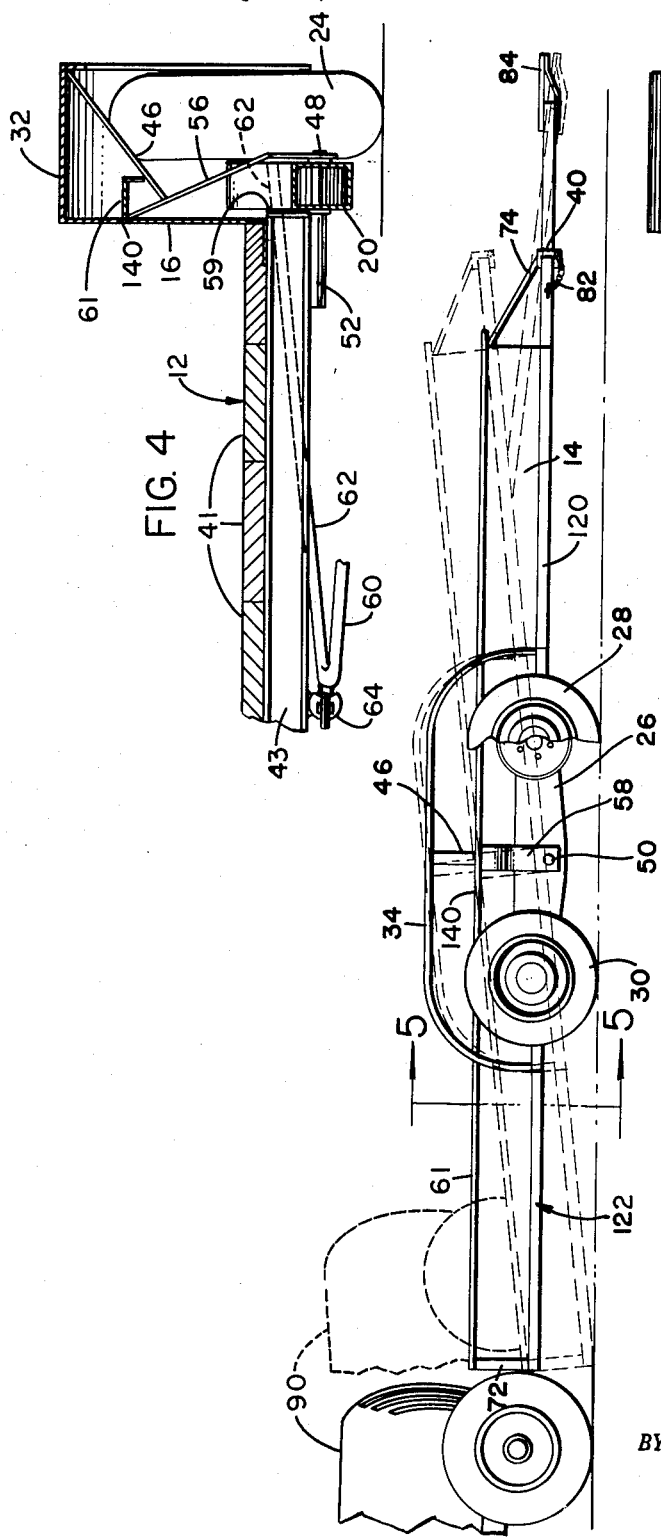
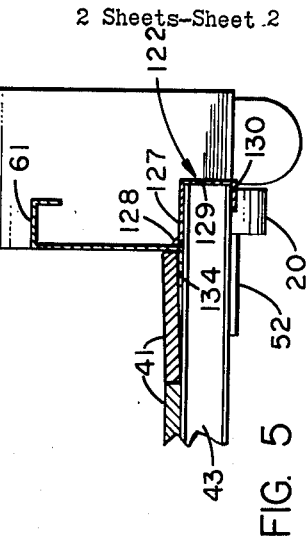
INVENTOR.
ROBERT W. MOYE
BY

United States Patent Office 3,214,047
Patented Oct. 26, 1965

3,214,047
TRAILER
Robert W. Moye, 4811 Redick St., Omaha, Nebr.
Continuation of application Ser. No. 19,749, Apr. 4, 1960.
This application Mar. 10, 1964, Ser. No. 351,885
6 Claims. (Cl. 214—506)

This invention relates to trailers for transporting tractors and wheeled equipment of the type in which the rear of the trailer may tilt downwardly so that a tractor can drive up onto the trailer from the rearward end, and particularly it is an object to provide a trailer onto which a tractor can be driven with much less danger.

Heretofore trailers of the tilting type have been built so high off of the ground that a tractor must climb them at a steep angle causing many accidents. These tractors usually have heavy up-raised loading booms often with large earth shoveling buckets at their upper ends, such an assembly weighing in total 7,000 pounds and more. For this reason, such tractor-mounted equipment is dangerously top heavy with a high center of gravity.

As a three and one-half ton tractor assembly drives up the steep incline onto such a trailer, the bed of the trailer tilts forwardly and crashes down onto the tongue with violence.

It is this violent crashing that has caused much overturning of these top heavy pieces of equipment. In these accidents, as the equipment has fallen over, the driver has sometimes lost an arm or a hand, and in all cases, some property damage results.

It is, therefore, an object to provide means for building a trailer bed lower to the ground whereby a lesser amount of tilting of the bed is needed and whereby the extent of the downward crashing of the forward end of the trailer is lesser for lesser danger to equipment and operators.

Another object is to provide a tilt bed trailer having tandem wheels each braced by what is called an A-frame. The A-frame and the tandem wheel assembly have walking beams, both rotating about horizontal axes transverse to the line of draft.

Various types of trailers and particularly low hung trailers have been provided for transporting tractors and other heavy machines and equipment. However, because it is difficult to lower axles of trailers it is necessary to drive the tractors up relatively steep ramps and this is awkward, dangerous and ramps are seldom available.

So a further object of the invention is to provide a tractor carrying trailer in which the platform of the trailer is close to the ground and for the first time in this art, close enough that a standard small tractor can climb up on it from the rear without a ramp, a critical last three inches of this lowness being gained by a combination of new concepts.

A major object of the invention is to provide a trailer achieving a platform lower hung than ever heretofore known in my experience—in which side beams of the platforms are reinforced by heavy gauge U-shaped shields or fenders functioning as trusses and positioned over centrally positioned wheels of the trailer, cooperating with my concept of "stub" or non-continuous side wall rigidity flange members.

Another important object of the invention is to provide a trailer having a platform with centrally positioned pairs of wheels in which a tongue is pivotally mounted on the under surface of the platform and the platform is connected to the tongue by a releasable clevis whereby the forward end of the platform may readily tilt upwardly.

A still further object is to provide a low-hung tractor carrying trailer in which pairs of wheels are relatively close together at the sides in which the trailer is of a simple and economical construction.

Another important object of the invention is to provide a tilting platform trailer in which the tongue is pivotally mounted on the under surface of the platform and is secured to the platform by passing a pin through the tongue and a clevis, which is attached to the platform, thus allowing the forward end of the platform to be tilted upwards without removing the tongue from the trailer pulling vehicle.

The invention has objectives of using front and side walls of the platform as frame members and the fenders as frame member stiffeners.

With these and other objects and advantages in view the invention embodies a platform having side walls and a front wall, aligned triangular-shaped frames pivotally mounted on the under surface of the platform, wheels rotatably mounted on walking beams forming base elements of the frames, fenders mounted on the side walls and extended over the wheels, a tongue pivotally connected to the under surface of the platform, and a clevis supported by braces extended from the forward end of the platform and positioned to extend over the tongue.

This application is copending with the applicant's prior application, Serial No. 19,749, filed April 4, 1960, and titled "Trailer."

Other features and advantages of the invention will appear from the following description taken in connection with the drawings, wherein:

FIGURE 3 is a side elevational view of the trailer with parts broken away, showing the trailer in a transporting position in full lines and in a tractor loading position in broken lines.

FIGURE 4 is a fragmentary cross sectional view taken along the line 4—4 of FIGURE 1.

FIGURE 5 is a view in section taken along the line 5—5 of FIGURE 3.

Figure 1:
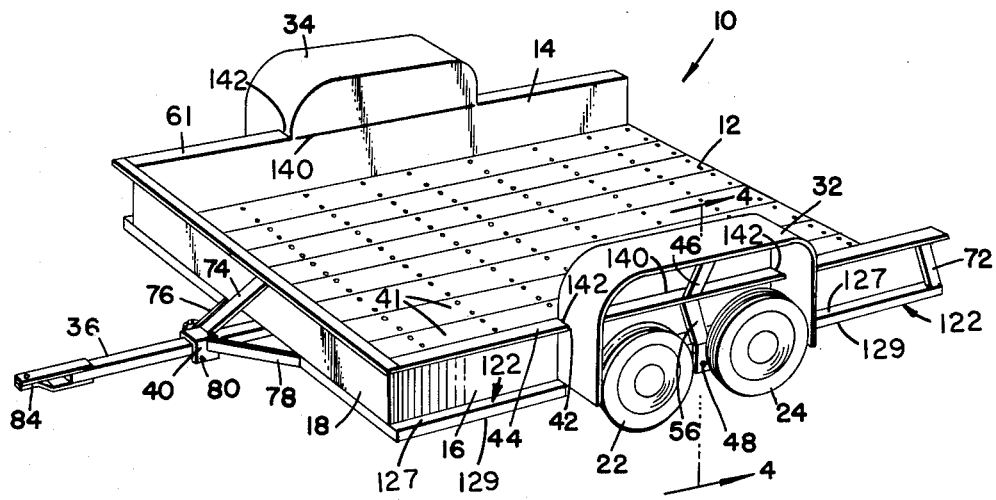
FIGURE 1 is a perspective view illustrating the tractor carrying trailer.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a platform having side walls 14 and 16, and a front wall 18, numeral 20 a walking beam on one side of the platform and having wheels 22 and 24 rotatably mounted thereon, numeral 26 indicating a walking beam on the opposite side of the platform and having wheels 28 and 30 rotatably mounted thereon, numeral 32 indicating a fender mounted on the side wall 16 and providing a shield for the wheels 22 and 24, numeral 34 indicating a fender mounted on the side wall 14 and providing a shield for the wheels 28 and 30, and numeral 36 a tongue pivotally mounted by a bearing 38 on the under surface of the platform and to which the platform is connected by a clevis 40.

The platform 12 comprises a plurality of planks or floor members 41 laid upon and bolted or otherwise fixed to a plurality of spaced cross members including a centrally disposed I-beam 43, a pair of channel bars 45 and 47 disposed one on either side and spaced from the I-beam 43. Further channel bars 49 and 51 are positioned forwardly and rearwardly of the respective channel bars 45 and 47.

The bars 49 and 51 are of greater length than the bars 45 and 47 and the I-beam 43 whereby their ends extend equal distances beyond the ends of the beam and the adjacent bars.

Figure 2:
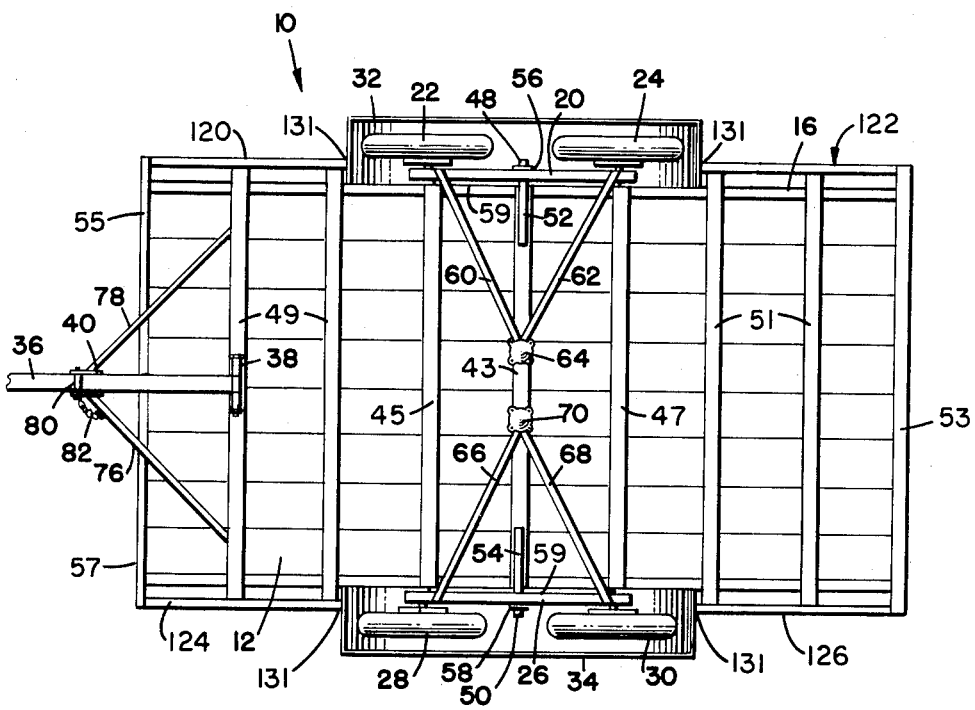
FIGURE 2 is a view looking upwardly toward the under surface of the trailer.

As best seen in FIGURE 2 the bar length differences provide an opening for the walking beams 20 and 26 on either side of the platform.

A further channel bar 53 spaced rearwardly of the bars 51 provide an end support for the platform. It will be seen that the bars 43, 45, 47, 49 51 and 53 all comprise transverse floor joists supporting the floor members 41 which latter can also be called decking 41.

The inner end of the tongue 36 is pivotally secured in the bearing 38 which latter is fixed to the underside of the forwardmost channel bar 49.

The outer edges of the fenders are supported by braces 46, which extend from outer edges of the flanges of the channel bars to outer edges of the fenders.

The walking beams are pivotally mounted on trunnion axles or pins 48 and 50, the inner ends of which are welded to the underside of the I-beam at 52 and 54, and outer ends of the pins are supported by struts 56 and 58. The walking beam 20 is supported by braces 60 and 62, which extend from a swivel joint 64, and the walking beam 26 is supported by similar braces 66 and 68 which extend from the swivel joint 70, the swivel joints also being welded to the undersurface of the I-beam. The pins 48 and 50 are in alignment with the swivels 64 and 70 whereby the walking beams with the wheels on the ends turn about the same centers.

Elongated plates 59 are fixed to the ends of the I-beam 43 and the ends of the plates are secured to respective forward and rearward channel bars 49 and 51. The plates 59 reinforce this area of the platform adjacent the walking beam mounts.

The side and end walls of the platform are formed of sheet material which is approximately Z-shaped in cross section having an inwardly extending lower flange which is fixed to the channel bars.

The flange of the side walls extend longitudinally of the platform on a line flush with the ends of the channel bars 49 and 51 and I-beams 43.

The upper flange extends outwardly to form a continuous rail 61. As shown at the point 42, in FIGURE 1, the fenders are notched to receive the rail whereby the fenders form trusses reinforcing the side walls.

The ends of the side walls 14 and 16 are reinforced by struts 72. A further clevis brace 74 extends from the rail of the end wall to the upper surface of the clevis whereby in combination with the braces 76 and 78 suspends the clevis from the front of the platform.

The clevis 40 is positioned forwardly of the platform 12 and is held laterally by braces 76 and 78. The braces 76 and 78 have their inner ends fixed to the forward surface of the channel bar 49 and extend forwardly and inwardly. The forward ends of the braces are fixed to the clevis 40.

The clevis is U-shaped in cross section so that it slides over the tongue 36, and the clevis is retained in position on the tongue by a pin 80 which extends through the side walls of the clevis, and which is retained in position by a chain 82. The extended end of the tongue is provided with a hitch 84.

Channel sections 55 and 57 are provided at the forward end of the platform and extend inwardly from either side to and all fixed to the clevis braces 76 and 78 providing clearance for the tongue 36.

*Operation*

With the parts assembled as illustrated and described the pin 80 is withdrawn from the clevis when it is desired to load a tractor on the trailer whereby the clevis may move upwardly and the trailing end of the platform downwardly when it is desired to load a tractor on the trailer or run the tractor from the trailer, and with the parts positioned as illustrated and described the platform is supported in a very slightly inclined position, as indicated by the broken lines, in FIGURE 3, when loading a tractor thereon or removing a tractor therefrom. By this means loading tractors and other heavy equipment on the trailer, and removing such machines from the trailer is greatly facilitated.

With reference to FIGURE 3, the forward end of tractor 90 is shown in a position for loading and in particular, it will be noted that the level of the top of the trailer bed or platform is on a line spaced below the axis of the front axle of the tractor even when the bed is in the upper full line position..

Tractor loading is thereby facilitated in that the tractor may be driven up to the trailer, with the front wheels against the untilted trailer platform and thereafter forward movement of the tractor wil cause the wheels to climb the platform, drawing it down against the ground into the inclined position, shown in broken lines in FIGURE 3.

The front wheels of the tractors are about 15″ from ground to center of the axle on a common 16″ tractor front wheel with 6″ 50–16 tire. As the top of the rear of the bed of the trailer is about 14¾ inches above the ground, sometimes about 14 inches, there is at least a ¼″ difference, as is a critical difference attained by my special frames arrangement.

This special frame arrangement comprises strong right and left stub or non-continuous side wall rigidity flange members, specifically: a right rearward, a left forward and a left rearward stub rigidity flange members 120, 122, 124 and 126 respectively, each extending from the respective outer end toward the center of the trailer and terminating in a strong welded abutment connection against and to the respective fender 32 or 34 as seen at points 131.

Each of the non-continuous side wall rigidity flanges 120, 122, 124 and 126 respectively has an outwardly extending upper horizontal or step portion 127, preferably extending outwardly from and welded at its inner end to the lower end of the respective side wall 14 or 16, welding being indicated at 128 in FIGURE 5; and further with a downwardly extending vertical or web portion 129 which preferably extends downwardly approximately 3¼ inches to receive thereagainst the respective channel bars 49 or 51.

Each non-continuous side wall rigidity flange number 120, 122, 124 and 126, respectively, further has an inwardly extending lower flange 130 also best seen in FIGURE 3 and extending from the respective end of the trailer inwardly to the respective fender.

It will be seen that, in FIGURES 4 and 5, the side walls 16 each have inwardly extending, horizontally disposed, lower flanges 134 which latter extend under those ones of the planks 41 of the platform 12 which are closest thereto and between the latter and the respective channel bars 43.

The fenders 32 and 34 are of heavy gauge steel for forming an integral and substantial part of the strength of the frame to connect the stub side wall rigidity flange members 120, 122, 124 and 126 and are not merely mud fenders as on an automobile or on a truck.

The fenders 32 and 34, as seen in FIGURE 4, are welded to the tops of the sides 12 and 14 of the trailer on a side of each fender as best seen from the top of the bed of the trailer and at 140 and on the front and rear of each fender as at 142 around the notches 42 of each fender.

The special frame arrangement further comprises connecting the side wall rigidity flange members 120, 122, 124 and 126 to the ends of those transverse bed-supporting frame members 49 and 51 whereby the fenders 32 and 34 and side wall rigidity flange members 120, 122, 124 and 126 all work together to give side strength yet clearance for the low bed.

Having the A-frame braces 60 and 62 connected to the undersides (not the tops or sides) of the walking beams 20 and 26 is also an important feature in the low-bed position attaining combination, giving further clearance for up-swinging of the walking beams on rough ground.

Referring to FIGURE 4 it will be seen that the walking beam braces 60 and 62 are each straight and that they are free to extend through the dotted line position shown in FIGURE 4. To make this freedom of movement possible the under side of the trailer has what can be called notches 200 in it. As best seen in FIGURE 2, the notches being in the pathway of the braces 60, 62, 66 and 68 to receive the braces and to permit the braces to swing upward into areas extending substantially above the under sides of adjacent floor joists for the freedom of movement of walking beam braces.

It will be seen that the notches 200 are formed first of all by the spacing of the floor joists 43, 45 and 47, secondly by the absence of any side wall in the area of the walking beam pathway; this latter being possible by using fenders as part of the longitudinal strength of the trailer. Thirdly the notches 200 are made possible by the absence of longitudinal frame members which in conventional trailers are disposed beneath the floor joists, there being no longitudinal frame members beneath or between the floor joists of the trailer of this invention in the area of the pathway of walking beam braces.

It will be seen that the actual distance of the top of the rear end of the platform from the ground surface from an imaginary ground surface plane extending under the wheels is affected by the size of the tires of the trailer. With my construction, it is possible to achieve a spacing of approximately 14¾ inches between such a ground surface plane and the top of the trailer platform when tires are used on the trailer which are approximately of the outside diameter of a 7:60–15" passenger car tire. When 700–15" commercial tires are used on the trailer, a still lower platform top is possible.

The rate of dimensions of the tires of the trailer and of the tractor as above described do not have their full affect because the tire is normally compressed by the weight of the respective vehicle. In operation, it will be seen that the horizontal portion 127 of each rigidity flange member preferably extends outwardly from the side of the trailer a sufficient distance to form an adequate step for an operator to climp upon it. I have found having portion 127 extend outwardly a distance of 6 inches provides both good rigidity and an adequate step.

From the foregoing specification, it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place on the market.

It is thought that persons skilled in the art to which the invention relates will be able to obtain a clear understanding of the invention after considering the description in connection with the drawings.

Changes in shape, size and rearrangement of details and parts such as come within the purview of the invention claimed may be resorted to in actual practice, if desired.

I claim:

1. A vehicle carrying trailer for receiving wheeled vehicles driven up over its rearward end, comprising a platform, two walking beams disposed between the ends of said platform and each having a wheel rotatably mounted on each of its ends pivotally mounted on each side of the platform, a tongue extended from the forward end of said platform, means attaching said tongue to said platform, said platform being elongated in the direction of travel, side walls attached to the sides of said platform and extending longitudinally thereof, fenders spaced from ends of said platform and attached to said side walls and extending outwardly therefrom respectively over said wheels, said trailer having right and left forward and rearward rigidity flange members attached to the side walls thereof respectively and extending outwardly from the sides of said side walls, said rigidity flange members each respectively extending from a respective one of the ends of each one of said side walls longitudinally inwardly of said trailer toward said fender and each being substantially abutted with and attached to the respective fender for providing rigidity at forward and rearward portions of said side walls, said rigidity flange members each comprising: a horizontal portion extending the length of the respective rigidity flange member and attached on its inner side to the respective side wall and extending outwardly therefrom a substantial distance, and a vertical web portion attached to the outer end of and substantially co-extensive with said horizontal flange portion and extending downwardly therefrom, said side wall and fenders both extending a substantial distance above said platform whereby they form frame elements of said trailer, the spaces between said walking beams and said side walls respectively being substantially free of horizontally extending rigidity flange members and other horizontal space-consuming frame elements whereby said walking beams can be disposed as close as possible to respective inner sides of said side walls for maintaining the width of said trailer at a minimum, and the cargo space between the inner sides of said side walls at a maximum because said fenders provide the trailer with sufficient strength.

2. A vehicle carrying trailer for receiving wheeled vehicles driven up over its rearward end, comprising a platform, two walking beams disposed between the sides of said platform each having a wheel rotatably mounted on each of its ends pivotally mounted on each side of the platform, a tongue extended from the forward end of said platform, means attaching said tongue to said platform, said platform being elongated in the direction of travel, side walls attached to the sides of said platform and extending longitudinally thereof, fenders attached to said side walls and extending outwardly therefrom respectively over said wheels, said trailer having right and left forward and rearward rigidity flange members attached to the side walls thereof respectively and extending outwardly from the sides of said side walls, said rigidity flange members each respectively extending from a respective one of the ends of each one of said side walls longitudinally inwardly of said trailer toward said fender and each being substantially abutted with and attached to the respective fender for providing rigidity at forward and rearward portions of said side walls, said rigidity flange members each comprising: a horizontal portion extending the length of the respective rigidity flange member and attached on its inner side to the respective side wall and extending outwardly therefrom a substantial distance, and a vertical web portion attached to the outer end of and substantially co-extensive with said horizontal flange portion and extending downwardly therefrom, said side wall and fenders both extending a substantial distance above said platform whereby they form frame elements of said trailer, the spaces between said walking beams and said side walls respectively being substantially free of horizontally extending rigidity flange members and other horizontal space-consuming frame elements whereby said walking beams can be disposed as close as possible to respective inner sides of said side walls for maintaining the width of said trailer at a minimum, and the cargo space between the inner sides of said side walls at a maximum because said fenders provide the trailer with sufficient strength to make this practical, supporting bars extending transversely of and forming parts of said trailer platform, said bars being spaced apart from each other, certain of said bars being disposed adjacent said fenders and terminating substantially at said side walls, others of said bars being disposed forwardly and rearwardly respectively of said fenders and extending beyond said side walls and beneath said side walls, said other horizontal bars being attached at their ends to the respective adjacent rigidity flange member for providing a rigid durable construction.

3. A vehicle carrying trailer for receiving wheeled vehicles to be driven up over its rearward end, comprising a platform elongated in the direction of the line of travel, two walking beams disposed at the sides of said platform adjacent its longitudinal center and pivotally connected to said platform, wheels rotatably mounted one on each end of said walking beams, a tongue extended from the forward end of said platform, means attaching said tongue to said platform, side walls attached to the sides of said platform and extending longitudinally thereof, horizontal walking beam axles attaching said walking beams to said trailer, walking beam braces arranged in pairs with the braces of a pair attached to opposite ends of a walking beam respectively and extending inwardly of said trailer to a vertex disposed in alignment with the respective walking beam axle along an approximately horizontal line normal to the line of draft, pivot attachment means at each vertex attaching each respective pair of braces to the underside of said platform whereby said walking beam braces support said walking beams in a manner preserving possibility of low trailer bed height, said platform having spaced floor joists extending transversely of said trailer and having decking disposed above said floor joists, the underside of said trailer having notches therein which latter are in the pathway of upward movement of said walking beam braces to receive said braces and to permit said braces to swing upward into areas extending substantially above the undersides of adjacent floor joists for road clearance and for the freedom of upward movement of said walking beam braces into said notches without impediment from said side walls or from any frame members.

4. A vehicle, said vehicle having a platform having sides in general alignment with the line of travel, two walking beams disposed one adjacent each side of said platform, said walking beams each being elongated generally parallel to the direction of travel, means pivotally connecting each walking beam to said platform adjacent the longitudinal center of the respective walking beam for the pivoting of the respective walking beams about horizontal axes extending at a right angle to the line of travel, wheels disposed one adjacent each end of each of said walking beams, means interconnecting each of said wheels with the respective walking beam end for the rotation of said wheels about horizontal axes extending normal to the line of travel, walking beam braces arranged in pairs with the braces of a pair attached to opposite ends of a walking beam respectively and extending inwardly of said trailer to a vertex disposed on an approximately horizontal line normal to the line of draft and extending through the respective walking beam axle, pivotal attachment means at each said vertex attaching each respective pair of braces to the underside of said platform whereby beams are free to pivot and whereby said walking beam braces support said walking beams in a manner preserving possibility of low height for the top of said platform.

5. An article of manufacture comprising a vehicle body, an elongated beam at one side of said body, means pivotally connecting said beam to said body at a center section of said beam for the pivoting of said beam about a horizontal beam-axis normal to said beam, a wheel disposed at one end of said beam, means rotatably connecting said wheel to said beam for rotation about a horizontal wheel-axis normal to said beam, a pair of beam braces attached one to each end of said beam and extending inwardly of said body to a vertex disposed on an approximately horizontal line normal to the said beam and extending through said beam-axis, pivotal attachment means at said vertex attaching said pair of braces to the underside of said body whereby said beam is free to pivot and whereby said beam braces support said beam.

6. A vehicle carrying trailer for receiving wheeled vehicles to be driven up over its rearward end, comprising a platform elongated in the direction of the line of travel, two walking beams disposed one at each side of said platform adjacent its longitudinal center and pivotally connected to said platform, wheels rotatably mounted one on each end of said walking beams a tongue extended from the forward end of said platform, means attaching said tongue to said platform, horizontal walking beam axles attaching said walking beams to said trailer, walking beam braces arranged in pairs with the braces of a pair attached to opposite ends of a walking beam respectively and extending inwardly of said trailer to a vertex disposed in alignment with the respective walking beam axle along an approximately horizontal line normal to the line of draft, pivot attachment means at each vertex attaching each respective pair of braces to the underside of said platform whereby said walking beam braces support said walking beams in a manner preserving possibility of low trailer bed height.

References Cited by the Applicant
UNITED STATES PATENTS

| | | |
|---|---|---|
| 1,288,757 | 12/18 | Timm. |
| 2,462,868 | 3/49 | Ives. |
| 2,487,325 | 11/49 | Foster. |
| 2,536,148 | 1/51 | Andrews. |
| 2,754,131 | 7/56 | Tulin. |
| 2,803,362 | 8/57 | Saenz. |
| 3,003,780 | 10/61 | Lundahl. |

HUGO O. SCHULZ, *Primary Examiner.*